Feb. 5, 1935.  T. S. SMITH  1,990,101
DRAG BRAKE
Filed Feb. 14, 1934   2 Sheets-Sheet 2
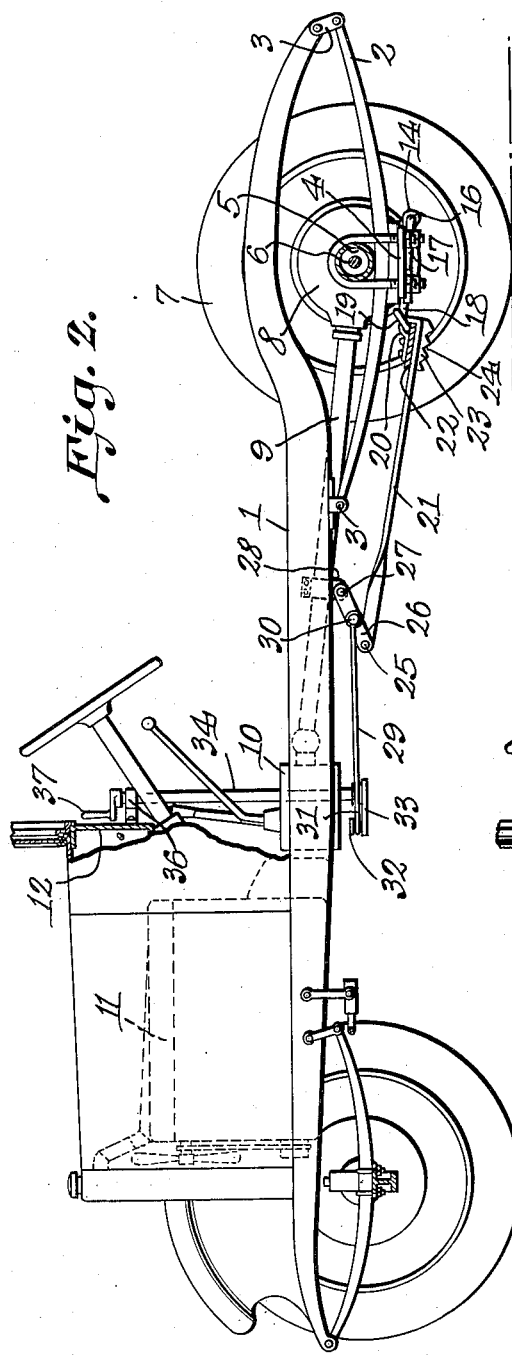
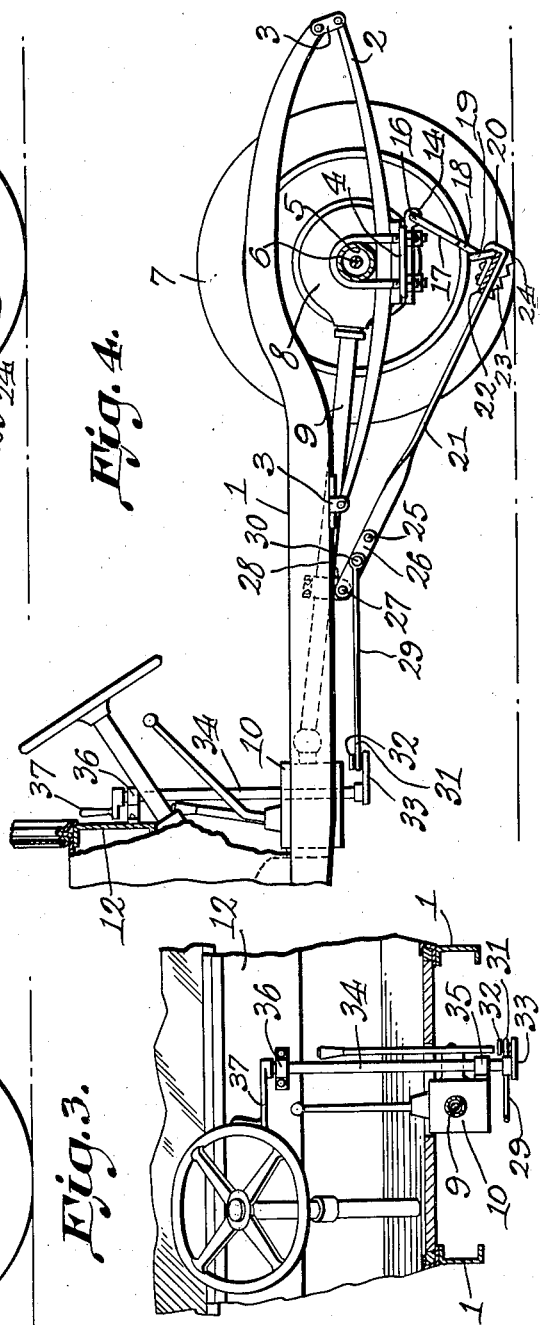
T. S. Smith  Inventor
By C. A. Snow & Co.  Attorneys.

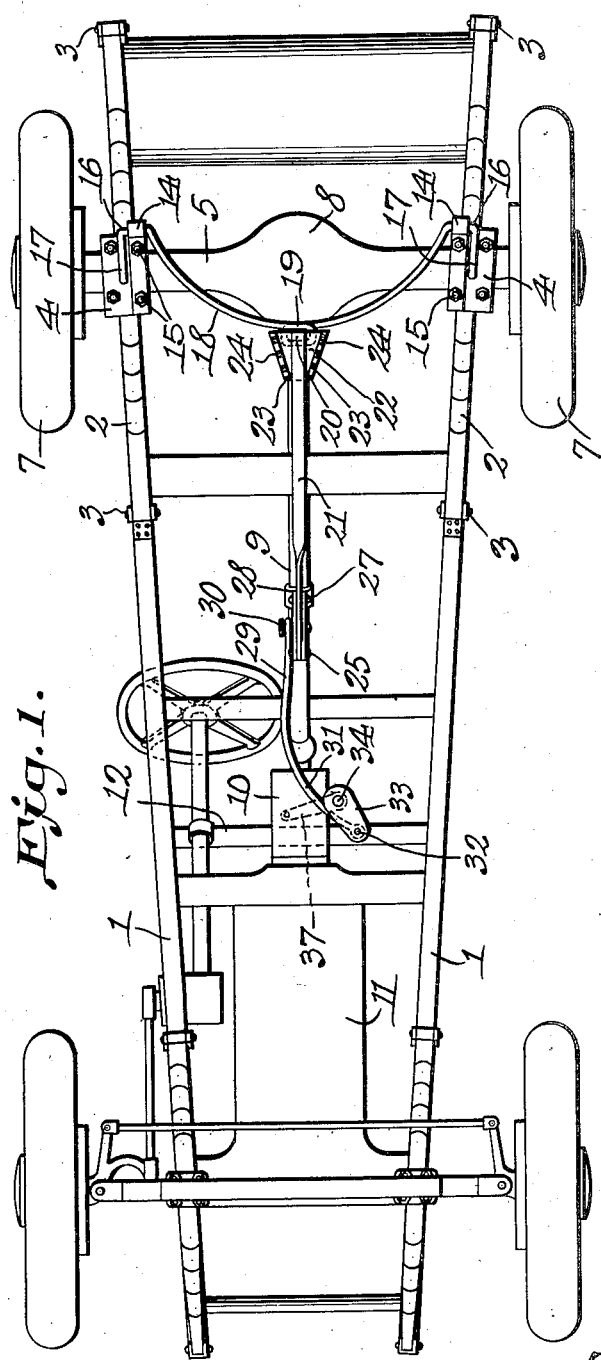
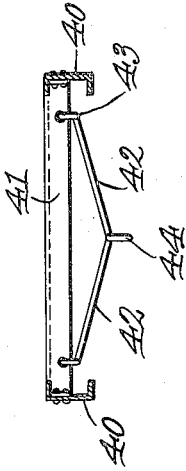
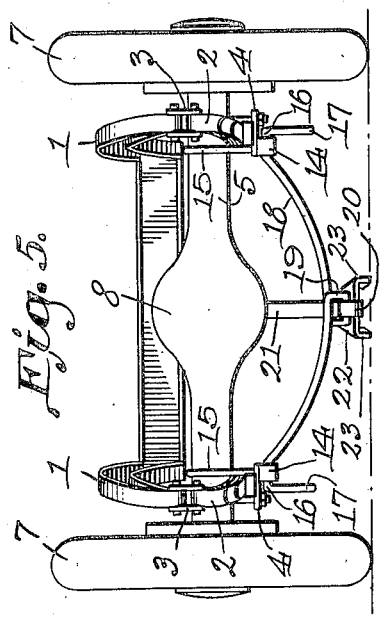

Patented Feb. 5, 1935

1,990,101

UNITED STATES PATENT OFFICE 1,990,101

DRAG BRAKE

Thaddeus S. Smith, Indianapolis, Ind.

Application February 14, 1934, Serial No. 711,233

4 Claims. (Cl. 188—5)

This invention aims to provide a simple means under the control of an operator, whereby a motor-propelled vehicle may be prevented from skidding on smooth or slippery pavements.

The invention aims to provide a novel shoe, adapted to engage the ground or pavement, to provide novel means for holding the shoe resiliently in contact with the ground, at the will of an operator, and to provide novel means for moving the shoe to and from operative position.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in bottom plan, a device constructed in accordance with the invention, the shoe being raised;

Fig. 2 is a side elevation, with parts in section, the view showing the shoe raised;

Fig. 3 is a transverse section showing the dashboard and attendant parts in elevation;

Fig. 4 is a view similar to Fig. 2, but showing the shoe lowered to an operative position;

Fig. 5 is a rear elevation, the shoe being lowered;

Fig. 6 is a fragmental cross section showing a modification.

In the drawings, there is shown the frame of a vehicle, comprising chassis bars 1. The springs 2 are secured at 3 to the chassis bars 1. By means of clips 4, or otherwise, the rear axle housing 5 is connected to the intermediate portions of the springs 2. In the rear axle housing 5 operates the shaft 6 which drives the rear wheels 7. A differential mechanism, indicated sufficiently by the numeral 8, is interposed in the shaft 6. To the housing of the differential mechanism 8 is connected a forwardly-extended tube 9 carrying the shaft which drives the differential mechanism, the said shaft being operatively connected to the speed change gearing, the casing of which is shown at 10. The speed change gearing derives its movement from an engine 11 on the frame. The instrument board is shown at 12.

It is with such a vehicle, or with a similar vehicle, that the device forming the subject matter of this application is adapted to be used. No novelty is claimed for the structure hereinbefore set forth, saving insofar as it may enter into combination with parts hereinafter described.

In carrying out the invention, bearings 14 are detachably secured, by U-bolts 15, or otherwise, to the rear axle housing 5, inwardly of the clips 4. In the rear portions of the bearings 14, a shaft 16 is mounted for rocking movement. At its ends, the shaft 16 is supplied with transversely-projecting fingers 17, which, cooperating with the bearings 14, prevent the shaft 16 from moving endwise to any undesirable extent.

The shaft 16 comprises a downwardly bowed, resilient intermediate portion 18. The central part of the intermediate portion 18 of the shaft 16 may be formed into an eye 19, pivotally engaged with a hook 20 at the rear end of an operating member or rod 21. In the hook 20 is secured the top plate of an inverted trough-shaped shoe 22, having downwardly extended, forwardly converging side walls 23 provided with teeth 24.

The forward end of the operating member 21 is pivoted at 25 to the lower end of a lever 26, the upper end of the lever 26 being fulcrumed at 27 on a hanger 28 detachably but firmly secured to the tube 9.

In the event that the construction of the vehicle happens to be such that the tube 9 is not available, recourse may be had to such a structure as that delineated in Fig. 6. In that figure, the chassis members are shown at 40, and the ends of a horizontal bar 41 are connected to them. The upper ends of the downwardly converging arms 42 of a bracket 43 are connected rigidly to the bar 41, and in its intermediate portion, the bracket has a depending part 44 which takes the place of the hanger 28.

The rear end of a link 29 is pivoted at 30 to the intermediate portion of the lever 26. The link 29 has a laterally curved forward end 31, as Fig. 1 will show. The forward end 31 of the link 29 is pivoted at 32 to the outer end of a horizontal arm 33, secured to the lower end of a shaft 34. The shaft 34 is journaled in a bearing 35, located on the casing 10 of the speed change gearing, or elsewhere. The shaft 34 also is journaled in a bearing 36 mounted on the instrument board 12. At its upper end, the shaft 34 carries a crank 37, or other suitable operating member.

In practical operation, the shaft 34 may be rotated by means of the crank 37, and the arm 33 on the lower end of the shaft imparts movement to the link 29, the link 29 tilting the lever 26 on its fulcrum 27, and carrying the bowed intermediate portion 18 of the shaft 16 forwardly, into the position of Fig. 2, the shaft 16 rocking in the bearings 14. The shoe 22, thus, is raised out of contact with the ground. It remains out of contact with the ground, because the curved end 31 of the link 29 of Fig. 1 extends inwardly of the shaft 34, the pivotal connection 32 between the link 29 and the arm 33 being located outwardly of the shaft 34, and the arm 33 extending outwardly with respect to the longitudinal center of the vehicle frame. It is clear that with the parts arranged as shown in Fig. 1, there will be no tendency for the operating member 21 to swing downwardly, and bring the shoe 22 into contact with the ground, until the shaft 34 is rotated.

When the shaft 34 is rotated in the proper direction by means of the crank 37, the operation above described is reversed, the shoe 22 swinging downwardly to the position of Fig. 4, and the teeth 24 of the shoe coming into contact with the ground. It will be obvious that the shoe will have a tendency to prevent the vehicle from skidding sidewise. The rear wheels 7 of the vehicle are not lifted off the ground, when the shoe 22 is in the lower position of Fig. 4, because the bowed intermediate portion 18 of the shaft 16 will yield. The said portion of the shaft, being under tension, tends to press the shoe 22 the more securely upon the ground, and the shoe is made particularly effective in preventing side skidding upon a wet pavement, an icy pavement or road, or under any other condition in which skidding is likely to occur.

One of the chief virtues of the device forming the subject matter of this application is that it can be attached to any ordinary vehicle, without working extensive changes therein.

Having thus described the invention, what is claimed is:

1. In a drag brake for vehicles, a vehicle frame, a shaft journaled on the frame and including a downwardly bowed, resilient intermediate crank portion, a soil-engaging shoe connected to said portion of the shaft, and means under the control of an operator for rotating the shaft to swing said portion of the shaft up and down, thereby to raise and lower the shoe.

2. In a drag brake for vehicles, a vehicle frame, a shaft journaled on the frame and including a downwardly bowed, resilient, intermediate crank portion, a soil-engaging shoe connected to said portion of the shaft, and means under the control of an operator, and connected to said portion of the shaft, for rotating the shaft, to swing said portion of the shaft up and down, thereby to raise and lower the shoe.

3. In a drag brake for vehicles, a vehicle frame, a shaft journaled on the frame and including a downwardly bowed, resilient, intermediate crank portion, a soil-engaging shoe, an operating member extended longitudinally of the vehicle and holding the shoe on the shaft, and means under the control of an operator for actuating the operating member, to swing the crank portion of the shaft up and down, thereby to raise and lower the shoe.

4. In a drag brake for vehicles, a vehicle frame, a substantially vertical operating shaft under the control of an operator and journaled on the frame, an arm on the lower portion of the shaft, a lever, means for fulcruming the lever at its upper end on the vehicle frame, a link having its forward end pivoted to the arm, and having its rear end pivoted to the intermediate portion of the lever, a crank member mounted to rock on the vehicle, a soil-engaging shoe connected to the crank member, and an operating element pivoted to the crank member, the forward end of the operating element being pivoted to the lower end of the lever.

THADDEUS S. SMITH.